United States Patent
Abraham

(10) Patent No.: US 11,162,783 B1
(45) Date of Patent: Nov. 2, 2021

(54) FIBER-OPTIC 3D IMAGING

(71) Applicant: Yoed Abraham, Givat-Shmuel (IL)

(72) Inventor: Yoed Abraham, Givat-Shmuel (IL)

(73) Assignee: Abraham Yoed, Givat-Shmuel (IL)

( * ) Notice: Subject to any disclaimer, the term of this patent is extended or adjusted under 35 U.S.C. 154(b) by 0 days.

(21) Appl. No.: 17/126,120

(22) Filed: Dec. 18, 2020

(51) Int. Cl.
  *G02B 6/06* (2006.01)
  *G01B 11/24* (2006.01)
  *H04N 13/254* (2018.01)

(52) U.S. Cl.
  CPC .......... *G01B 11/24* (2013.01); *G02B 6/06* (2013.01); *H04N 13/254* (2018.05)

(58) Field of Classification Search
  CPC ........ G02B 6/06; G02B 6/08; G02B 6/02085; G02B 6/02095; G02B 6/02142; G02B 6/02395; G02B 6/3885; G02B 6/403; G02B 6/4434; G02B 6/448; G02B 23/2469; G02B 21/0032; G02B 21/0052; G02B 21/361; G02B 21/367; G02B 23/04; G02B 26/103
  USPC .......................................................... 348/46
  See application file for complete search history.

(56) References Cited

U.S. PATENT DOCUMENTS

| | | | |
|---|---|---|---|
| 7,242,468 B1 | 7/2007 | Zhang | |
| 10,175,421 B2 | 1/2019 | Tasker et al. | |
| 10,264,954 B2 | 4/2019 | Lamarque et al. | |
| 2005/0128196 A1* | 6/2005 | Popescu ................. | G01S 17/48 345/420 |
| 2013/0024029 A1* | 1/2013 | Tran ..................... | A61B 5/0205 700/278 |
| 2014/0268093 A1* | 9/2014 | Tohme .................. | G01S 17/003 356/3.08 |
| 2016/0041334 A1 | 2/2016 | Suijver et al. | |
| 2017/0139131 A1 | 5/2017 | Karafin et al. | |

OTHER PUBLICATIONS

Flusberg et al. (2005). Fiber-optic fluorescence imaging. *Nature methods*, 2(12), 941-950.

* cited by examiner

*Primary Examiner* — Masum Billah
(74) *Attorney, Agent, or Firm* — Pearl Cohen Zedek Latzer Baratz LLP; Aryeh Rosenzweig

(57) ABSTRACT

A fiber-optic, three-dimensional imager leveraging acceptance cone of each fiber optic in an illumination collector array to identify surface geometries of a target area based on reflection angles. The captured reflections are directed to a light sensor and form an areal distribution on the sensor that is rendered into a topographical model of the general target surface using a construction algorithm.

17 Claims, 7 Drawing Sheets

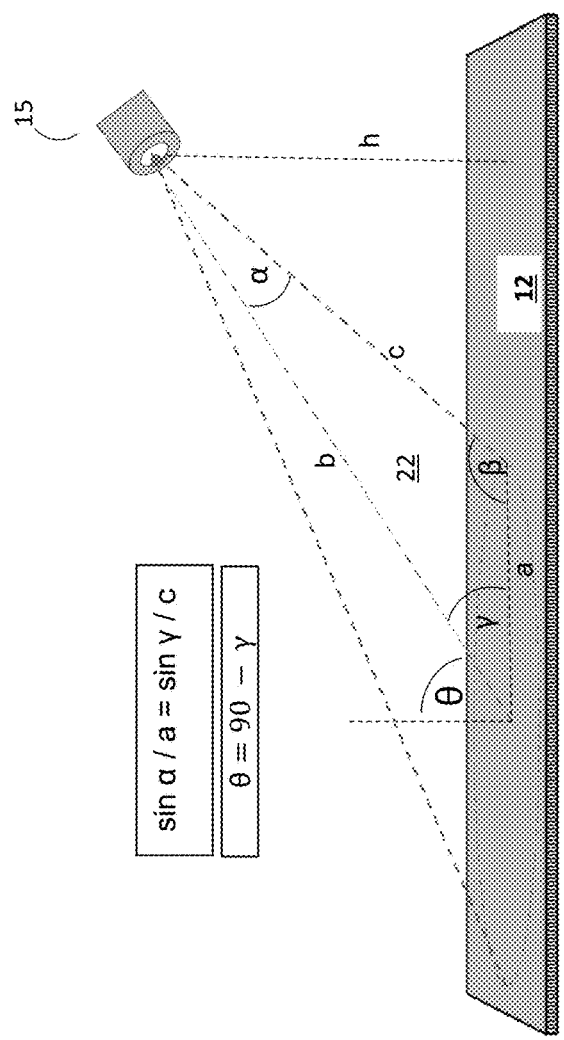
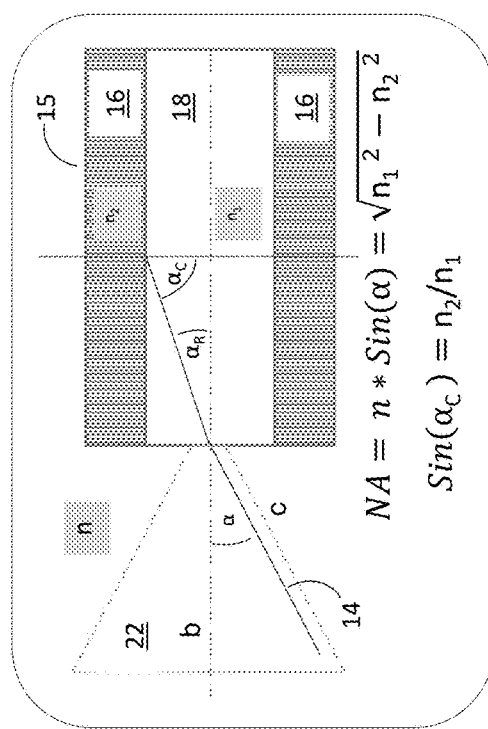
FIG. 2B
FIG. 2A

FIBER-OPTIC 3D IMAGING

BACKGROUND OF THE INVENTION

There are multiple methods for obtaining three-dimensional (3D) information of objects. Typically, objects are scanned and the scan data is then resolved into a topographical model using a scanning device making use of principles such as confocal microscopy, structured Light, stereovision & time of flight, or moving a target object in front of a sensing system.

These methods are usually divided into two types: contact and non-contact 3D scanners.

Contact 3D scanners contact the target surface to capture the 3D scan data. They require a relatively long scan time compared to non-contact methods and also risk the danger of damaging the target object.

Non-contact 3D scanners usually use laser or structured light to illuminate the target object and capture reflectance that is then processed to generate a 3D model. Non-contact scanners are quicker than contact scanners and cannot damage the target object. However, non-contact scanners lack the precision of contact scanners.

Non-contact scanners also suffer from a variety of shortcoming depending on the technology employed. For example, confocal based scanners are relatively large thereby rendering scanning of large objects into a cumbersome process. The scanner bulkiness also impedes scanning of difficult to access surfaces.

Structured light-based scanners suffer from optical aberrations of the projector that can cause degradation of performance in time. Additionally, such scanners are typically bulky also rendering the usage cumbersome.

Stereovision based scanners require relevant movement of the target object which in certain settings is not practical or is inconvenient.

Therefore, there is a need for a compact an accurate 3D imager functional while stationary.

SUMMARY OF THE INVENTION

According to the teachings of the present invention there is provided a fiber-optic imager including one or more illuminators operative to direct illumination toward target areas of a target surface; and an array of collector optic fibers, each fiber of the array configured to capture the illumination reflected from one of the target areas within an acceptance cone within a full acceptance angle of each of the fibers so as to form an areal distribution in the array among fibers collecting the illumination reflected and fibers not collecting the illumination, the areal distribution corresponding to a collective surface geometry of the target areas.

According to a further feature of the present invention, the illuminators are implemented as light emitting diodes (LEDs).

According to a further feature of the present invention, each of the LEDs is in communication an illuminator fiber optic.

According to a further feature of the present invention, the LEDs are implemented as LED sensors.

According to a further feature of the present invention, each of the collector optic fibers is in communication with a light sensor.

According to a further feature of the present invention, the light sensor is implemented as a LED light sensor.

According to a further feature of the present invention, two or more of the LEDs are operative to emit illumination of different wave lengths.

According to a further feature of the present invention, wherein two or more of the collector optic fibers are implemented with differing numerical apertures.

According to a further feature of the present invention, two or more of the collector optic fibers are disposed at different receiving angles relative to a line normal to the target surface.

According to a further feature of the present invention, there is also provided a spacer operative to contact a surface of the target surface so as to define a distance between the target surface and the collector optic fibers.

According to a further feature of the present invention, there is also provided a processor in communications with the light sensor, the processor configured to construct a three-dimensional model of the target surface in accordance with captured reflectance by the collector optic fibers.

There is also provided according to the teachings of the present invention, a method for constructing a visual three-dimensional model of a target surface, the method including: directing illumination toward target areas of a target surface; and capturing the illumination reflected in an array of collector optic fibers, each fiber of the array configured to capture the illumination reflected from one of the target areas within an acceptance cone at an angle within an acceptance angle of each of the fibers so as to form an areal distribution in the array among fibers collecting the illumination reflected and fibers not collecting the illumination, the areal distribution corresponding to a collective surface geometry of the target areas.

According to the teachings of the present invention there is provided the illumination includes illumination of different wavelengths.

According to the teachings of the present invention there is provided the directing illumination toward target areas of a target surface is implemented as periodic illumination.

According to a further feature of the present invention, there is also provided, directing illumination from the array of collector optic fibers toward target areas of the target surface synchronously with the periodic illumination.

According to a further feature of the present invention, there is also provided, adjusting a collection angle of the array of collector optic fibers, the collection angle measured between an axis of the collector optic fibers and a line normal to the target surface.

According to a further feature of the present invention, there is also provided, constructing a three-dimensional model of the target surface in accordance with the areal distribution in the array among fibers collecting the illumination reflected and fibers not collecting the illumination.

BRIEF DESCRIPTION OF THE DRAWINGS

The subject matter regarded as the invention is particularly pointed out and distinctly claimed in the concluding portion of the specification. The invention is best understood in view of the accompanying drawings in which:

FIGS. 2A-2B are schematic depictions of a collector optic fiber highlighting the effect of the refractive indices of the clad and the core on the numerical aperture defining an acceptance cone for illumination reflecting from a target, according to an embodiment;

Figure 1:
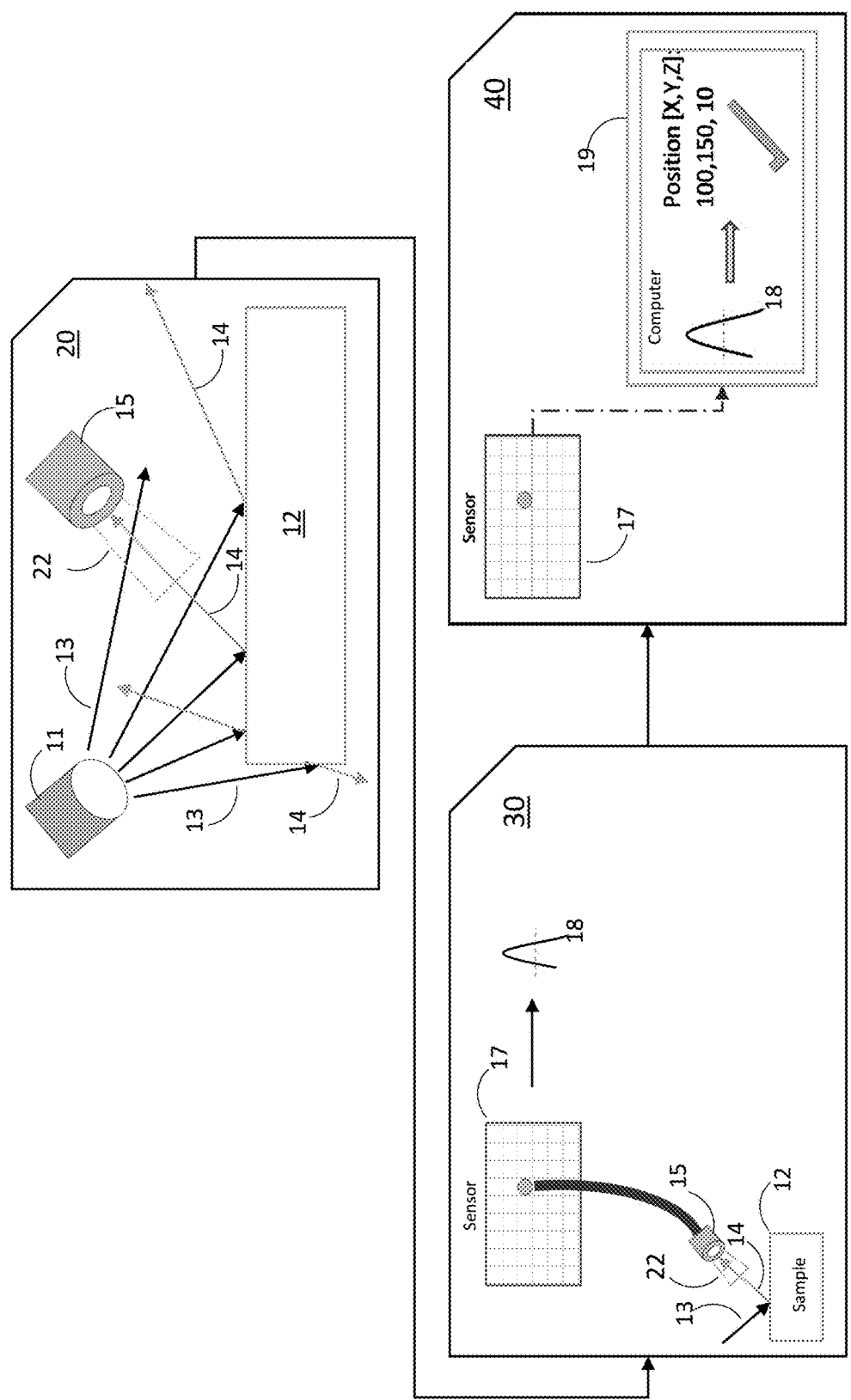
FIG. 1 is a pictorial flow chart depicting image capture steps employed in a fiber optic, three-dimension (3D) imager, according to an embodiment.

It will be appreciated that for the sake of clarity, elements shown in the figures may not be drawn to scale and reference numerals may be repeated in different figures to indicate corresponding or analogous elements.

DETAILED DESCRIPTION OF THE PRESENT INVENTION

In the following detailed description, specific details are set forth in order to facilitate understanding of the invention; however, it should be understood by those skilled in the art that the present invention may be practiced without these specific details.

Unless otherwise defined herein, scientific and technical terms used in connection with the present application shall have the meanings commonly understood by those of ordinary skill in the art.

Moreover, there is no intention to be bound by any expressed or implied theory presented in the preceding technical field, background, brief summary or the following detailed description.

Furthermore, well-known methods, procedures, and components have been omitted to highlight the invention. Reference numbers repeated among figures indicate identical or functionally similar elements.

Embodiments of the present invention are directed, inter alia, to a fiber-optic, three-dimensional imager leveraging the acceptance cone of each fiber optic in an illumination collector array to identify surface geometries of a target area based on reflection angles. The resulting areal distribution on a sensor is then rendered into a topographical model of the general target surface using a construction algorithm of the general target known to those skilled in the art.

The fiber-optic 3D imager represents an advance in the field of 3D imaging in that it is compact and capable of generating 3D topographical models in the absence of device scanning. The imager has application in a large variety of applications. Applications include medical endoscopy, brain surgery, dental, epidemic and other medical imaging, 3D printing, pipe examination, chip testing.

Turning now to the figures, FIG. 1 is a pictorial flow chart generally depicting the primary steps employed by the 3D fiber-optic imager according to an embodiment.

Specifically, in step 1, illumination 14 is directed to target 12 and reflected as reflected illumination 13 captured by a collector optic fiber 15 having a known acceptance cone 22 covering a known target area of target 12. In step 2, captured illumination propagates through collector fiber 15 to sensor 17 and translated into an electric signal 18. In step 3, electric signal 18 is directed to a computer 19 for algorithmic construction of a topographical model of the surface of target 12 and outputs the image on a suitable output device like monitor or printer.

Examples of suitable illuminators 11 include light emitting diodes (LEDs) lasers, halogen light, fluorescent light. In certain embodiments, an external illumination is employed.

Examples of suitable collector optic fibers 15 include:

| Mode | Wavelength [nm] | Core [μm] | N.A. |
|---|---|---|---|
| single | 500-600 | 10-Jan | 0.1-0.14 |
| Multi | 400-550 | 25 | 0.115 |
| Multi | 400-1200 | 105 | 0.22 |

Collector fiber density defines the resolution and in a certain embodiment 20×20 collector fibers are provided to achieve a 500 μm spatial resolution. Resolution enhancement is achieved through algorithmic methods.

In a certain embodiment the illumination and the collector fibers are implemented modularly to facilitate quick removal or replacement of fibers either individually or as units of fiber groups.

In a certain embodiment sensor 17 is implemented as a LED sensor capable of emitting or collecting in accordance with applied voltage, whereas in another embodiment sensor 17 is implemented as a complementary metal-oxide-semiconductor (CMOS), and other sensors providing such functionality.

An example of suitable 3D image construction algorithms will be discussed in the context of FIG. 7.

FIGS. 2A-2B are schematic depictions of a collector optic fiber highlighting the effect of the refractive indices of clad 16 and core 18 on the numerical aperture defining an acceptance cone for illumination reflecting from a target.

As shown in FIG. 2A, reflected ray 14 contacts core 18 (not drawn to scale) of collector fiber 15 and is diffracted in accordance with the change in refractive indices of air n and fiber core $n_1$. Complete internal refraction is achieved in accordance with critical angle $\alpha_c$. A cone of acceptance 22 is established in accordance with the numerical aperture NA as shown and having full acceptance angle of $2\alpha$ as is known in the art. FIG. 2B depicts the target area within a given cone of acceptance 22 to advantageously enable calculation of the coordinates of a target area based on the particular collector fiber that captured reflected illumination. Accordingly, an array of collector fibers in which some fibers capture reflected illumination and others do not produces an areal distribution that after rendering into an electronic signal and processing with algorithmic construction methods a corresponding topographical model of the target surface is generated as noted above.

Figure 3:
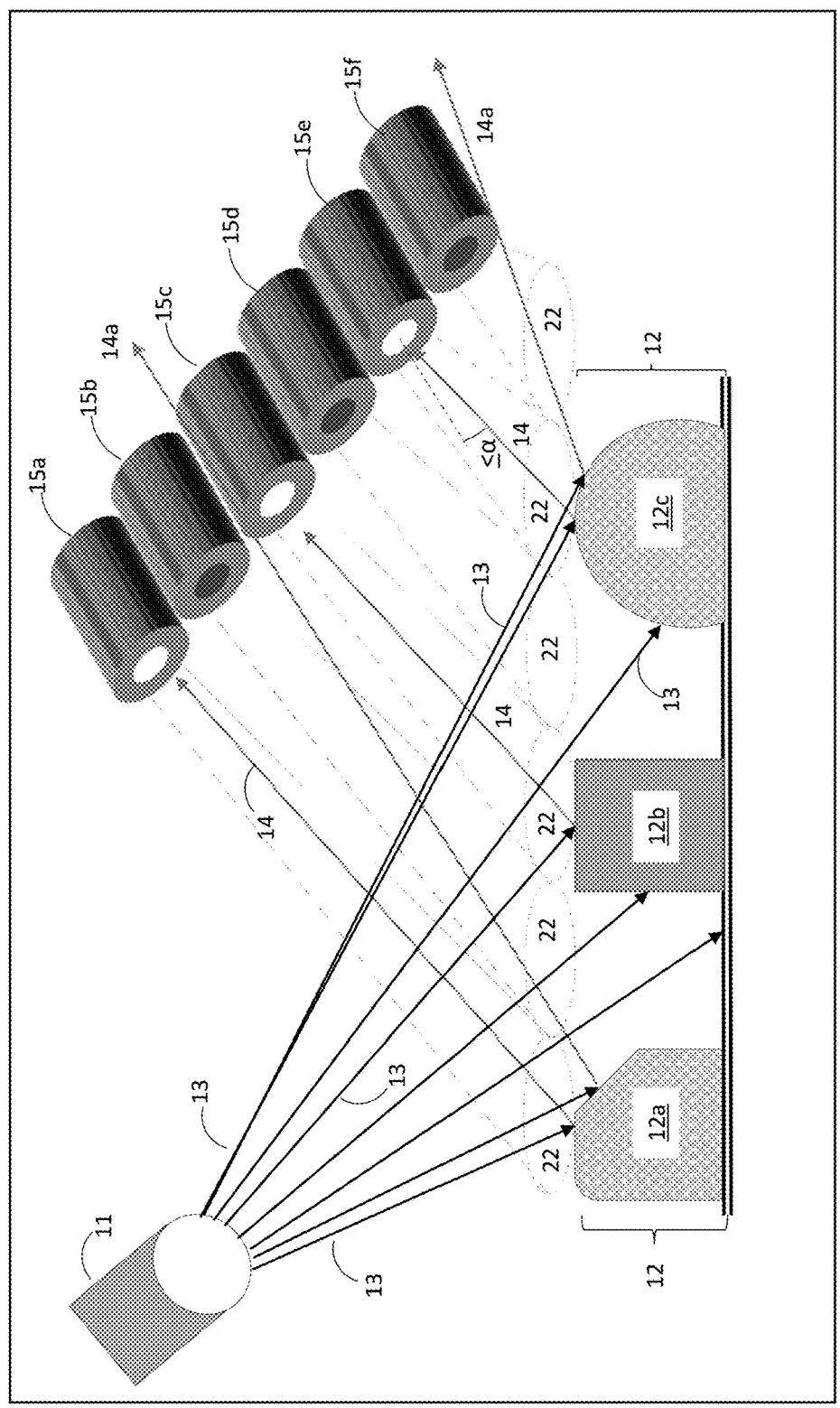
FIG. 3 is a schematic depiction of an image capture scheme highlighting the impact of surface geometry on fiber capture of illumination reflected from a target area, according to an embodiment.

FIG. 3 is a schematic depiction of the effect of target area geometry on image capture, according to an embodiment.

Specifically, depicted is a close-up view of a target 12 having various surface protuberances 12a-12c and acceptance cones 22 of each respective collector optic fiber 15a-15f. When illumination rays 13 from illuminator 11 reflects within an area bound by an acceptance cone at a reflection angle within the range of angles bound by the cone the illumination reflection is captured by the respective collector fiber. For example, a first reflected illumination 14 from protuberance 12a reflects within an area bound by acceptance cone 22 at an angle within cone boundaries (full acceptance angle) is captured by collector 15a whereas a second illumination ray 14a reflects outside of the cone boundaries and therefore is not captured by collector 15a. As shown this reflection ray passes between collectors 15b and 15c. It should be appreciated that this ray will not be accepted by the adjacent collector 15b because the ray reflects at an angle outside the boundaries of acceptance cone 22 of collector 15b. Analogously, illumination reflections 13 are captured by collectors 15c and 15e because they reflect within target areas enclosed by their respective acceptance cone at an angle within the boundaries of the acceptance cone.

This scheme generates a distribution pattern within the array of fiber collectors as shown; collectors 15a, 15c, and 15e capture reflected illumination 14 at an angle less than or equal to a while collectors 15b 15d, and 15f do not capture reflected illumination 14. This distribution pattern corresponds to surface irregularities of the target area 12 and therefore when the image information is processed by a construction algorithm one can construction a topological model.

Figure 4:
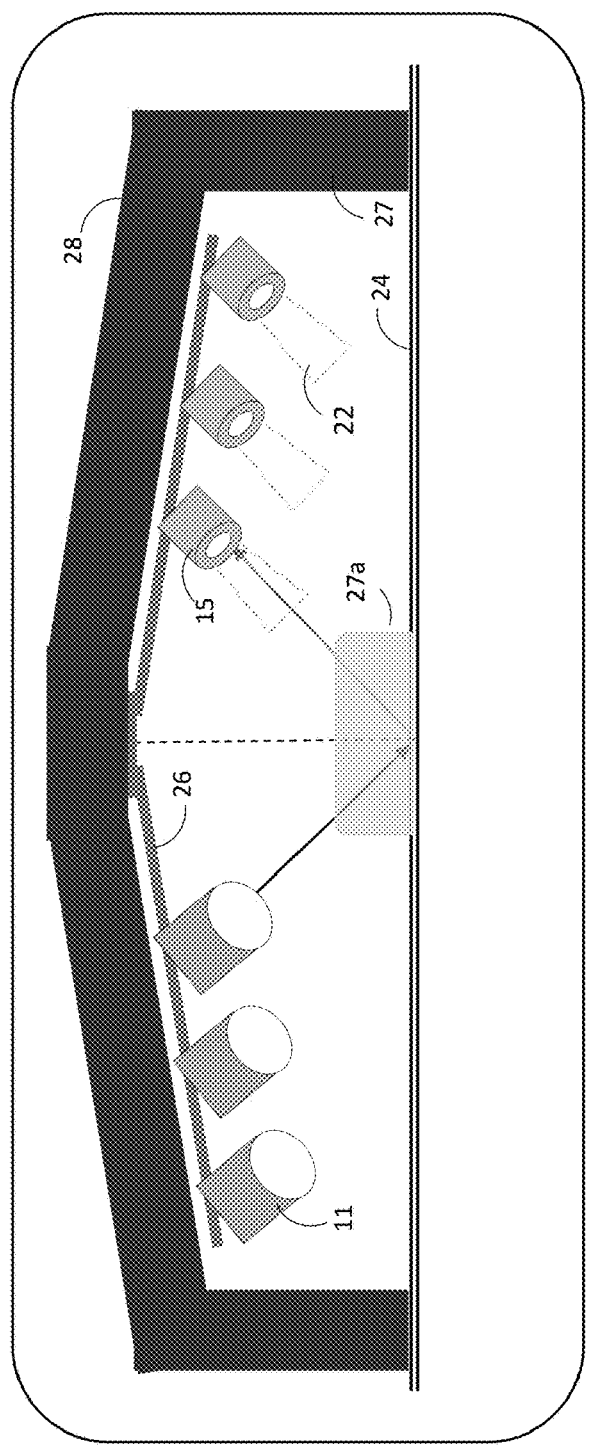
FIG. 4 is a schematic depiction of an fiber-optic imager and spacer housing, according to an embodiment.

FIG. 4 is a schematic depiction of a fiber-optic imager enclosed in a housing, according to an embodiment.

As shown, illuminators 11 and collector optic fibers 15 are mounted inside housing 28. In a certain embodiment, the housing has a spacer 27 operative to contact target surface 24 to provide a distance between the target surface 24 and collective fibers 15. The known distance is used in image construction calculation.

It should be appreciated that modification of key parameters modifies imager functionality. The distance between collectors 15 defines both spatial and depth resolution. (Their distance is measured from their respective axes.) Whereas the number of collector fibers and their mount angle relative to a vertical normal define lateral coverage and depth of scan.

In a certain embodiment the collectors are disposed vertically and in another embodiment the collectors are disposed both on a vertical plane and a horizontal plane.

In a certain embodiment the imager is fitted with a motor configured to change mount angle of the entire collector array.

In a certain embodiment, collector fibers parameters are non-homogeneous in accordance with design requirements. For example, in a certain embodiment, numerical apertures vary from one fiber to the next. In another embodiment, the angles at which the fiber collectors are disposed varies from fiber to fiber. In another embodiment, the core thickness varies from fiber to fiber. In other embodiments, all of these variations are implemented on a row-by-row basis in either the X or Y axis of the collector array.

In a certain embodiment, imaging is implemented on a sub-surface basis by illuminating with wavelengths that have the capacity to penetrate certain materials like target object 27a.

Figure 5:
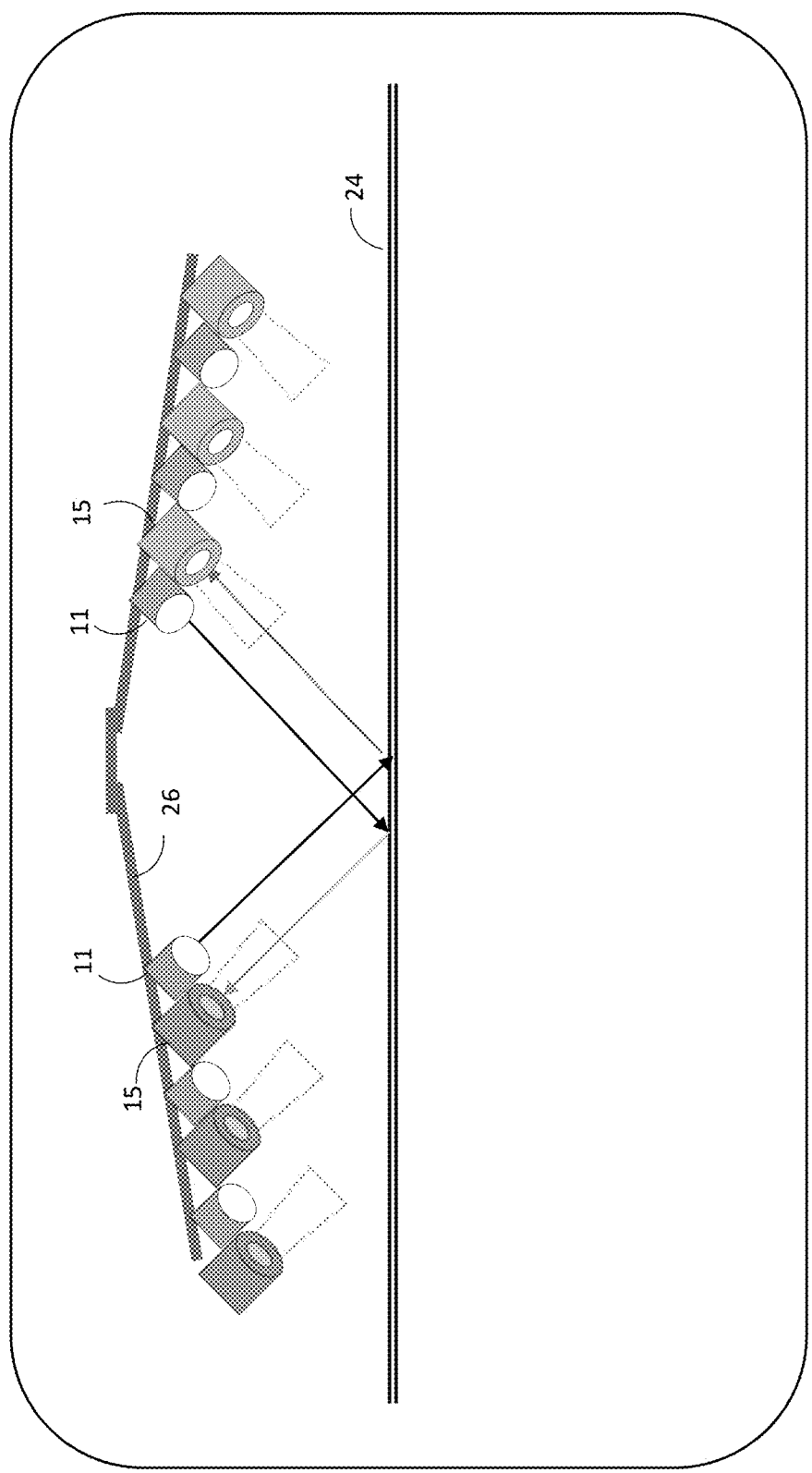
FIG. 5 is a schematic depiction of a fiber-optic imager employing both target illumination and reflection capture from two different planes, according to an embodiment.

FIG. 5 is a schematic depiction of a fiber-optic imager employing both target illumination and reflection capture from two different planes, according to an embodiment.

As shown, both illuminators 11 and collector optic fibers 15 are disposed on opposing planes to enable illumination and illumination capture from both sides of target object 24.

In a variant embodiment, illuminators 11 function also as collectors and collectors 15 also function as illuminators. This scheme is implemented by implementing the illuminators and the collectors as LED sensors configured to alternatively illuminate and collect synchronously. During illumination of a first array of LED sensors, the second array is functioning in the collecting mode. Conversely, when the LEDs of the second array are actuated as illuminators, the first array is actuated as collectors.

This scheme advantageously enables each viewing area to be viewed from two viewing able thereby adding image construction accuracy.

Figure 6:
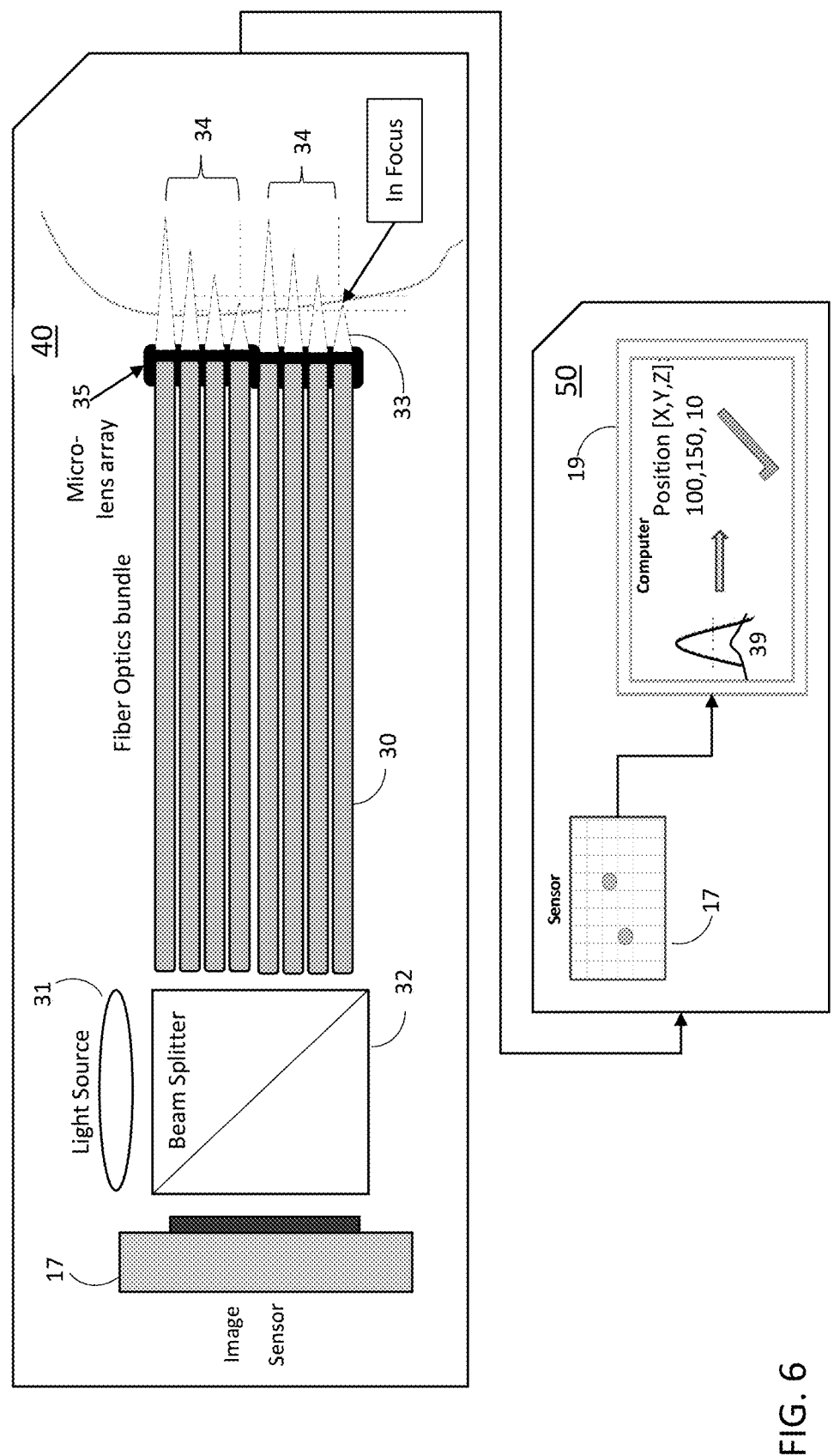
FIG. 6 is a pictorial flow chart of a fiber-optic imager employing fiber focal length as a discriminatory feature, according to an embodiment.

FIG. 6 is a pictorial flow chart of a fiber-optic imager employing fiber focal length as a discriminatory feature, according to an embodiment.

Specifically, in step 40 an illumination light source 31 directs light to a beam splitter 32 splitting the beam and directing a portion of the light through fibers of a fiber optic bundle 30. The light is then focused onto a target 38 with a micro lens array 35 of different focal lengths 34. As shown, micro lens array 35 includes two sets of fiber bundles, each of four different wave lengths 34, for example. When a focal length focuses on target 38, light returns through the corresponding fiber to beam splitter 31 where a portion of the light is direct onto sensor 17. In step 50, sensor 17 generates a dominant signal 39 that is rendered into an image in computer 19 with image construction algorithms to produce a topological model and outputs the model to the appropriate output device.

Figure 7:
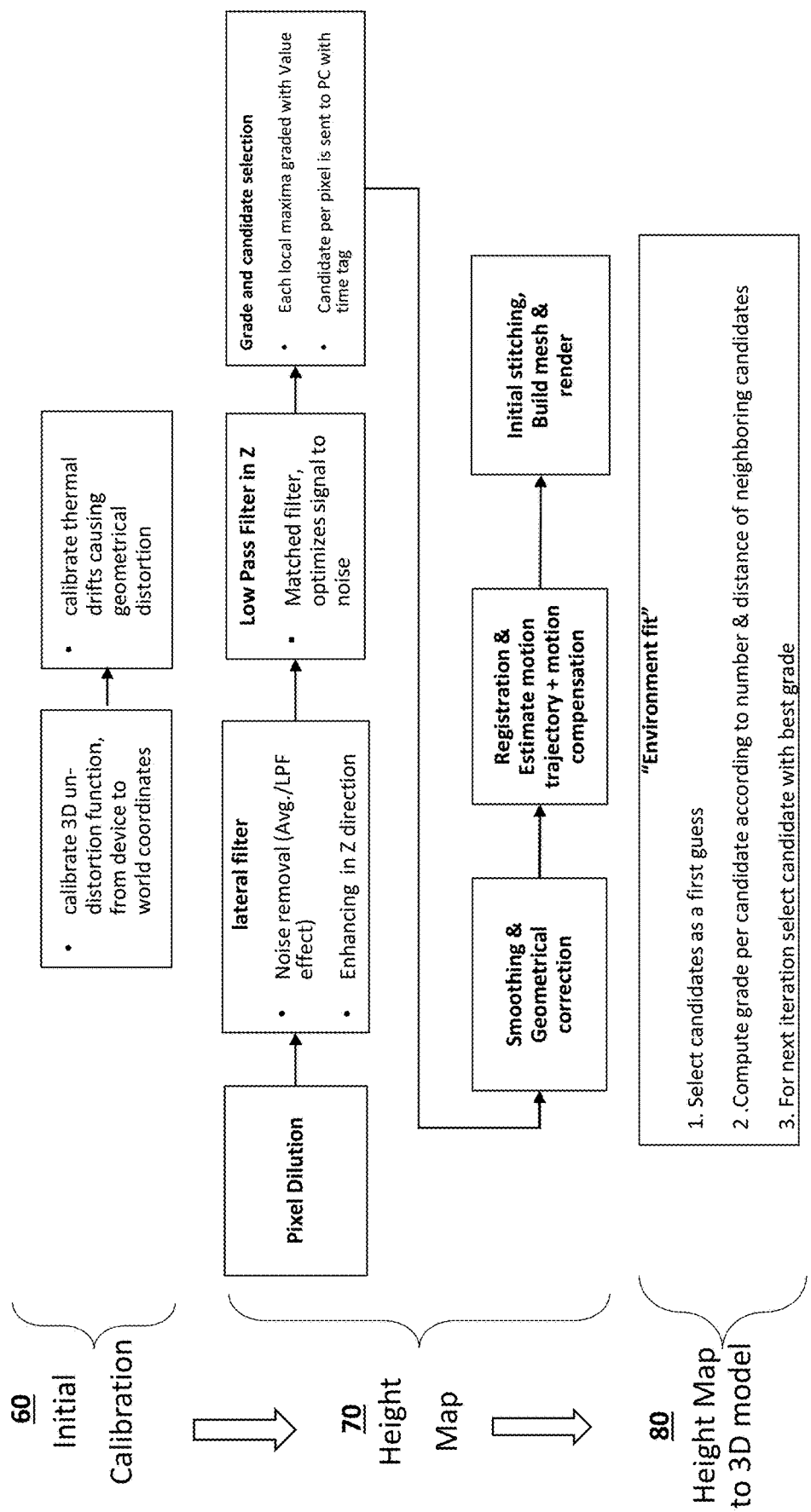
FIG. 7 is a high level flow chart of the processing steps in a 3D image construction algorithm, according to an embodiment.

FIG. 7 is an example of a high-level flow chart of the processing steps in a 3D image construction algorithm. As shown, initial calibration is implemented in the processing steps of Calibration Stage 60. Areal depth determination is implemented in the processing steps of Height Map Stage 70. Registration of height maps to create a final mesh is implemented in the processing steps of Height Map To 3D Model Stage 80.

It should be appreciated that embodiments formed from combinations of features set forth in separate embodiments are also within the scope of the present invention.

While certain features of the invention have been illustrated and described herein, modifications, substitutions, and equivalents are included within the scope of the invention.

What is claimed is:

1. A fiber-optic, depth imager comprising:
one or more illuminators operative to direct illumination toward a target surface having surface protuberances; and
an array of collector optic fibers, each of a plurality of the fibers of the array configured to selectively capture within its respective acceptance cone the illumination reflected from the target surface, so as to achieve depth resolution of the target surface, the depth resolution manifest as an areal distribution in the array of fibers capturing the illumination reflected and fibers not capturing the illumination reflected, the areal distribution corresponding to a collective surface geometry of the target surface,
wherein the acceptance cone is defined by circumscription of reflected ray c around on-axis line b at maximum capture angle α.

2. The imager of claim 1, wherein the illuminators are implemented as light emitting diodes (LEDs).

3. The imager of claim 2, wherein each of the LEDs is in communication an illuminator fiber optic.

4. The imager of claim 3, wherein the LEDs are implemented as LED sensors.

5. The imager of claim 2, wherein each of the collector optic fibers is in communication with a light sensor.

6. The imager of claim 5, wherein the light sensor is implemented as a LED light sensor.

7. The imager of claim 2, wherein two or more of the LEDs are operative to emit illumination of different wave lengths.

8. The imager of claim 1, wherein two or more of the collector optic fibers are implemented with differing numerical apertures.

9. The imager of claim 1, wherein two or more of the collector optic fibers are disposed at different receiving angles relative to a line normal to the target surface.

10. The imager of claim 1, further comprising a spacer operative to contact a surface of the target surface so as to define a distance between the target surface and the collector optic fibers.

11. The array of claim 5, further comprising a processor in communications with the light sensor, the processor configured to construct a three-dimensional model of the target surface in accordance with captured reflectance by the collector optic fibers.

12. A method for constructing a visual three-dimensional model of a target surface, the method including:
 directing illumination toward target areas of a target surface having surface protuberances; and
 capturing the illumination reflected in an array of collector optic fibers, each of a plurality of the fibers of the array configured to selectively capture the illumination reflected from the target surface within its respective acceptance cone so as to achieve depth resolution of the target surface, the depth resolution manifest as an areal distribution in the array of fibers collecting the illumination reflected and fibers not collecting the illumination, the areal distribution corresponding to a collective surface geometry of the target surface,
 wherein the acceptance cone is defined by circumscription of reflected ray c around on-axis line b at maximum capture angle α.

13. The method of claim 12, wherein the illumination includes illumination of different wavelengths.

14. The method of claim 12, wherein the directing illumination toward target areas of a target surface is implemented as periodic illumination.

15. The method of claim 14, further comprising directing illumination from the array of collector optic fibers toward target areas of the target surface synchronously with the periodic illumination.

16. The method of claim 12, further comprising adjusting a collection angle of the array of collector optic fibers, the collection angle measured between an axis of the collector optic fibers and a line normal to the target surface.

17. The method of claim 12, further comprising constructing a three-dimensional model of the target surface in accordance with the areal distribution in the array among fibers collecting the illumination reflected and fibers not collecting the illumination.

\* \* \* \* \*